(12) United States Patent
Bhaduri

(10) Patent No.: US 7,658,895 B2
(45) Date of Patent: Feb. 9, 2010

(54) PROCESS FOR RECOVERING BASE METALS FROM SPENT HYDROPROCESSING CATALYST

(75) Inventor: Rahul S. Bhaduri, Moraga, CA (US)

(73) Assignee: Chevron U.S.A. Inc, San Ramon, CA (US)

(*) Notice: Subject to any disclaimer, the term of this patent is extended or adjusted under 35 U.S.C. 154(b) by 44 days.

(21) Appl. No.: 11/946,736

(22) Filed: Nov. 28, 2007

(65) Prior Publication Data

US 2009/0136399 A1    May 28, 2009

(51) Int. Cl.
C01G 37/00    (2006.01)
(52) U.S. Cl. .......................... 423/56; 423/55
(58) Field of Classification Search .................. None
See application file for complete search history.

(56) References Cited

U.S. PATENT DOCUMENTS

| | | | | |
|---|---|---|---|---|
| 3,455,677 | A | * | 7/1969 | Litz ............................. 75/419 |
| 3,763,303 | A | | 10/1973 | Khuri et al. |
| 3,903,241 | A | | 9/1975 | Stevens et al. |
| 4,087,510 | A | * | 5/1978 | Steenken ..................... 423/53 |
| 4,131,455 | A | | 12/1978 | Edwards et al. |
| 4,145,397 | A | | 3/1979 | Toida et al. |
| 4,216,118 | A | | 8/1980 | Yoshida et al. |
| 4,220,634 | A | | 9/1980 | Deschamps et al. |
| 4,374,100 | A | | 2/1983 | Sebenik et al. |
| 4,409,190 | A | | 10/1983 | Van Leirsburg |
| 4,417,972 | A | | 11/1983 | Francis et al. |
| 4,432,953 | A | | 2/1984 | Hubred et al. |
| 4,434,043 | A | | 2/1984 | Singhal et al. |
| 4,500,495 | A | | 2/1985 | Hubred et al. |
| 4,541,868 | A | | 9/1985 | Lowenhaupt et al. |
| 4,548,700 | A | | 10/1985 | Bearden, Jr. et al. |
| 4,554,138 | A | | 11/1985 | Marcantonio |
| 4,661,265 | A | | 4/1987 | Olson et al. |

(Continued)

FOREIGN PATENT DOCUMENTS

JP    6228666 A2    8/1994

(Continued)

OTHER PUBLICATIONS

PCT Search Report and Written Opinion, Jul. 29, 2009.

*Primary Examiner*—Melvin C Mayes
*Assistant Examiner*—Melissa Stalder

(57) ABSTRACT

A method for recovering metals from a spent dispersed catalyst originating from a Group VIB metal sulfide catalyst containing at least a Group VB and Group VIII metal for hydrocarbon oil hydroprocessing is disclosed. In one embodiment, the method comprises the steps of: contacting the spent dispersed catalyst with a leaching solution containing ammonia and air to dissolve the group VIB metal and the Group VIII metal into the leaching solution at sufficient temperature and pressure; forming a slurry containing at least a group VIB metal complex and at least a group VIII metal complex, ammonium sulfate and solid residue containing at least a Group VB metal complex and coke; separating and removing the solid residue containing ammonium metavanadate and coke from the pressure leach solution (PLS); precipitating from the PLS at least a portion of the Group VIB metal and at least a portion of the Group VIII metal by controlling the pH at a pre-selected pH to selectively precipitate as metal complexes the Group VIB and Group VIII metals.

22 Claims, 1 Drawing Sheet

U.S. PATENT DOCUMENTS

| | | | |
|---|---|---|---|
| 4,666,685 A * | 5/1987 | Wiewiorowski | 423/55 |
| 4,762,812 A | 8/1988 | Lopez et al. | |
| 4,832,925 A | 5/1989 | Weir et al. | |
| 4,861,565 A | 8/1989 | Sefton et al. | |
| 4,900,522 A | 2/1990 | Chou et al. | |
| 5,099,047 A | 3/1992 | Sato et al. | |
| 5,246,570 A | 9/1993 | Cronauer et al. | |
| 5,415,849 A | 5/1995 | Toyabe et al. | |
| 5,457,258 A | 10/1995 | Hommeltoft et al. | |
| 5,505,857 A | 4/1996 | Misra et al. | |
| 5,573,556 A | 11/1996 | Wen | |
| 6,153,155 A | 11/2000 | Wen et al. | |
| 6,180,072 B1 | 1/2001 | Veal et al. | |
| 6,589,492 B2 | 7/2003 | Matsumoto et al. | |
| 6,673,732 B2 | 1/2004 | Muhler et al. | |
| 6,733,564 B1 | 5/2004 | Sahu et al. | |
| 7,033,480 B2 | 4/2006 | King | |
| 7,067,090 B2 | 6/2006 | Han et al. | |
| 7,182,926 B2 | 2/2007 | Akahoshi | |
| 7,375,053 B2 * | 5/2008 | Schmidt | 502/326 |
| 2003/0130118 A1 | 7/2003 | Koyama et al. | |
| 2004/0219082 A1 | 11/2004 | Matjie et al. | |
| 2004/0237720 A1 | 12/2004 | Moyes et al. | |
| 2004/0241066 A1 | 12/2004 | Jasra et al. | |
| 2005/0101480 A1 | 5/2005 | Ackerman et al. | |
| 2005/0109674 A1 | 5/2005 | Klein | |
| 2005/0118081 A1 | 6/2005 | Harris et al. | |
| 2005/0249652 A1 | 11/2005 | Scharifker et al. | |
| 2006/0051875 A1 | 3/2006 | Reppy et al. | |
| 2006/0135631 A1 | 6/2006 | Kopponen et al. | |
| 2006/0151399 A1 | 7/2006 | Brandts et al. | |
| 2006/0258531 A1 | 11/2006 | Koyama et al. | |
| 2007/0025899 A1 * | 2/2007 | Marcantonio | 423/53 |
| 2007/0098609 A1 | 5/2007 | McConnell | |
| 2007/0144944 A1 | 6/2007 | Del Bianco et al. | |

FOREIGN PATENT DOCUMENTS

| | | | |
|---|---|---|---|
| WO | WO 92/03520 A1 | 3/1995 | |

* cited by examiner

PROCESS FOR RECOVERING BASE METALS FROM SPENT HYDROPROCESSING CATALYST

RELATED APPLICATIONS

None.

TECHNICAL FIELD

The invention relates to a process for recovering metals from spent hydroprocessing catalyst.

BACKGROUND

Catalysts have been used widely in the refining and chemical processing industries for many years. Hydroprocessing catalysts, including hydrotreating and hydrocracking catalysts, are now widely employed in facilities worldwide. Used or "spent" hydroprocessing catalysts discharged from these facilities typically contain metal components such as molybdenum, nickel, cobalt, vanadium, and the like.

With the advent of heavier crude feedstock, refiners are forced to use more catalysts than before for hydroprocessing and to remove catalyst contaminants and sulfur from the feedstock. These catalytic processes generate huge quantities of spent catalyst. With the increasing demand and market price for metal values and environmental awareness thereof, catalysts can serve as a secondary source for metal recovery.

In order to recycle catalytic metals and provide a renewable source for the metals, efforts have been made to extract metals from spent catalysts, whether in supported or bulk catalyst form. US Patent Publication No. 2007/0025899 discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring solvent extraction as well as oxidation steps to recover metals from spent catalysts containing at least a metal sulphide.

There is still a need for an improved and simplified process to recover metals including but not limited to molybdenum, nickel, and vanadium from spent catalysts.

SUMMARY OF THE INVENTION

In one aspect, the invention relates to a method for recovering base metals including vanadium from a spent dispersed catalyst originating from a Group VIB metal sulfide catalyst promoted with a Group VIII metal for hydrocarbon oil hydroprocessing, the method comprising the steps of: contacting the spent dispersed catalyst with a leaching solution containing ammonia and air to dissolve the group VIB metal and the Group VIII metal into the leaching solution, forming a pressure leach slurry containing at least a group VIB soluble metal complex, at least a group VIII soluble metal complex, ammonium sulphate and solid residue containing ammonium metavanadate and coke; separating and removing the solid residue containing ammonium metavanadate and coke from the pressure leach slurry; precipitating from the pressure leach solution at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal.

In another aspect, the invention relates to a method for recovering vanadium, molybdenum and nickel from a spent dispersed catalyst, the method comprising the steps of: contacting the spent dispersed catalyst with a leaching solution containing ammonia and air to dissolve the molybdenum and nickel into the leaching solution, forming a pressure leach slurry containing molybdenum and nickel metal complexes, ammonium sulphate and solid residue containing ammonium metavanadate and coke; separating and removing the solid residue containing ammonium metavanadate and coke from the pressure leach slurry; adjusting the pH of the pressure leach solution by the addition of sulfuric acid to precipitate at least a portion of the molybdenum and nickel as metal complexes; separating and recovering molybdenum and nickel metal complexes from the supernatant containing 0.1 to 5% of the incoming molybdenum, 1 to 20% of the incoming vanadium, and 1 to 35% of the incoming nickel.

In one embodiment, the method further comprises the step of adding $H_2S$ to the supernatant to precipitate out the remaining molybdenum and nickel metal complexes, and subsequent recovery of the molybdenum and nickel metal sulfides from the ammonium sulphate supernatant.

DETAILED DESCRIPTION

Figure 1:
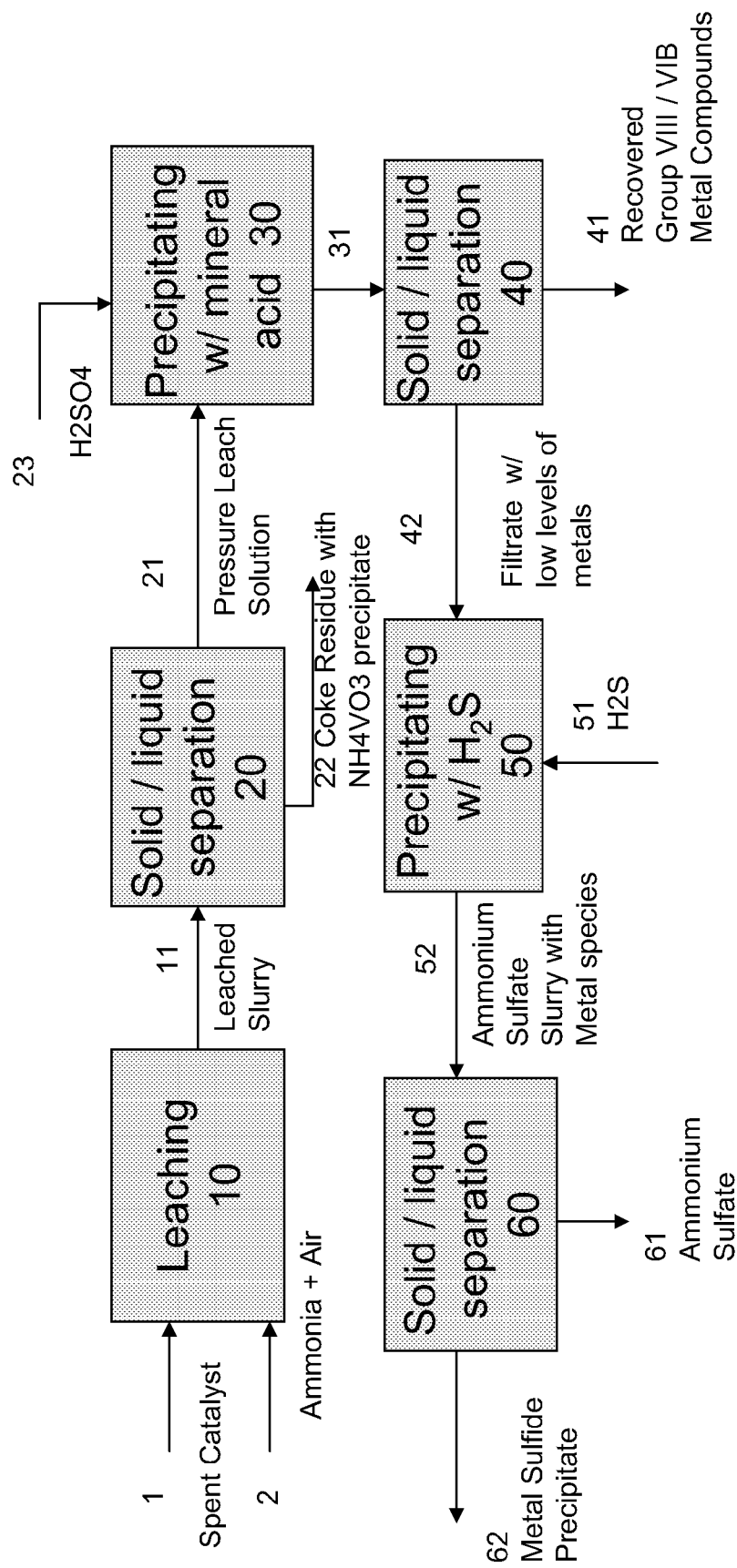
FIG. 1 provides an overview of an embodiment of the metal recovery process.

The following terms will be used throughout the specification and will have the following meanings unless otherwise indicated.

As used herein, "hydroprocessing" is meant any process that is carried out in the presence of hydrogen, including, but not limited to, methanation, water gas shift reactions, hydrogenation, hydrotreating, hydrodesulfurization, hydrodenitrogenation, hydrodemetallation, hydrodearomatization, hydroisomerization, hydrodewaxing and hydrocracking including selective hydrocracking.

As used herein, the phrase "one or more of" or "at least one of" when used to preface several elements or classes of elements such as X, Y and Z or $X_1$-$X_n$, $Y_1$-$Y_n$ and $Z_1$-$Z_n$ is intended to refer to a single element selected from X or Y or Z, a combination of elements selected from the same common class (such as $X_1$ and $X_2$), as well as a combination of elements selected from different classes (such as $X_1$, $Y_2$ and $Z_n$).

The Periodic Table referred to herein is the Table approved by IUPAC and the U.S. National Bureau of Standards, an example is the Periodic Table of the Elements by Los Alamos National Laboratory's Chemistry Division of October 2001.

In one embodiment, the spent catalyst originates from a dispersed (bulk or unsupported) Group VIB metal sulfide catalyst containing at least one of: a Group VB metal such as V, Nb; a Group VIII metal such as Ni, Co; a Group VIIIB metal such as Fe; a Group IVB metal such as Ti; a Group IIB metal such as Zn, and combinations thereof. In another embodiment, the spent catalyst originates from a dispersed (bulk or unsupported) Group VIB metal sulfide catalyst promoted with a Group VIII metal for hydrocarbon oil hydroprocessing. Promoters are typically added to a catalyst formulation to improve selected properties of the catalyst or to modify the catalyst activity and/or selectivity.

In another embodiment, the spent catalyst originates from a bulk catalyst precursor of the formula $(X)_a(M)_b[(CH_3CH_2)_cN(CH_3)_3]_dO_z$ as disclosed in US Patent Publication No. 20060060502, wherein X is a Group VIII non-noble metal, M is selected from Mo and W, c is an integer from 10 to 40, the molar ratio of a:b is from 0.5/1 to 3/1. In another embodiment, the spent catalyst originates from a hydroprocessing catalyst represented by the formula $(M^r)_a(X^u)_b(S^v)_c(C^w)_e(H^x)_f(O^y)_g(N^z)_h$ as disclosed in U.S. patent application Ser. No. 11/931972 with filing date of Oct. 31, 2007, wherein M represents at least one group VIB metal, such as Mo, W, etc. or a combination thereof, and X functions as a promoter metal, representing at least one of: a non-noble Group VIII metal such as Ni, Co; a Group VIIIB metal such as Fe; a Group VIB metal such as Cr; a Group IVB metal such as Ti; a Group IIB metal such as Zn, and combinations thereof (X is hereinafter referred to as "Promoter Metal"). Also in the equation, t, u, v, w, x, y, z representing the total charge for each of the component (M, X, S, C, H, O and N, respectively); ta+ub+vd+we+xf+yg+zh=0. The subscripts ratio of b to a has a value of 0 to 5 ($0<=b/a<=5$). S represents sulfur with the value of the subscript d ranging from (a+0.5b) to (5a+2b). C represents carbon with subscript e having a value of 0 to 11(a+b). H is hydrogen with the value off ranging from 0 to 7(a+b). O represents oxygen with the value of g ranging from 0 to 5(a+b); and N represents nitrogen with h having a value of 0 to 0.5(a+b). In one embodiment, a and b each is suitably greater than 0 such that the ratio of a:b is in the range of 1:5 to 10:1. In another embodiment, a=5; b=1 and b/a has a value of 0.2, for spent catalyst compositions having precursors of the formulae $(M)_5(X)(S)_{5.5}$, $(M)_5(X)(S)_{5.5}(C)(H)(O)(N)$, $(M)_5(X)(S)_{27}(C)_{66}(H)_{42}(O)_{30}(N)_3$ amongst others. In one embodiment where both molybdenum and tungsten present in the spent catalyst as Group VIB metal complexes, the molybdenum:tungsten molar ratio is in the range of 9:1 to 1:9.

As used herein, the term "spent catalyst" refers to a catalyst that has been used in a hydroprocessing operation and whose activity has thereby been diminished. For example, if a reaction rate constant of a fresh catalyst at a specific temperature is assumed to be 100%, the reaction rate constant for a spent catalyst temperature is 80% or less in one embodiment, and 50% or less in another embodiment. In one embodiment, the metal components of the spent catalyst comprise at least one of Group VB, VIB, and VIII metals, e.g., vanadium, molybdenum, tungsten, nickel, and cobalt. The most commonly encountered metal to be recovered is molybdenum. In one embodiment, the metals to be recovered from the spent catalyst are sulfides of Mo, Ni, and V.

In the sections that follow, the reference to "molybdenum" is by way of exemplification only for component (M) in the above formulae and is not intended to exclude other Group VIB metals/compounds and mixtures of Group VIB metal/compounds represented by (M) in the catalyst formula. Similarly, the reference to "nickel" is by way of exemplification only for the component (X) in the above formulae and is not meant to exclude other Promoter Metals, i.e., group VIII non-noble metal components; Group VIIIB metals; Group VIB metals; Group IVB metals; Group IIB metals and mixtures thereof that can be used in the catalyst formula.

As used herein, the reference to "vanadium" is by way of exemplification only for any Group VB metal component that may be added to the hydroprocessing catalyst or is present in the hydroprocessing feedstock, and is not intended to exclude other Group VB metals/compounds and mixtures of that may be present in the spent hydroprocessing catalyst for metal recovery.

In the sections that follow, the reference to "incoming molybdenum" (or "incoming nickel," or "incoming vanadium," etc.) refers to the amount of metal that is initially present in the spent catalyst prior to the metal recovery process.

In a hydroprocessing operation, a catalyst is typically enriched/deactivated with nickel and vanadium as "contaminants" in an amount ranging up to about 100 wt % of the fresh catalyst weight. In some operations, due to the rapid coke deposition rate, the catalyst is deactivated prior to achieving its full metals adsorption capacity. Such catalysts are taken out of service when the spent catalyst contains as little as 10 wt % nickel plus vanadium compounds.

In one embodiment, the spent catalyst is generally in the form of a dispersed suspension having an effective median particle size of 0.01 to 200 microns. In another embodiment, the spent catalyst has an average particle size of 0.01 to 100 microns. In a third embodiment, the spent catalyst is a dispersed slurry having an average particle size of 0.01 to 50 microns. In one embodiment, the spent catalyst has a pore volume of 0.05-5 ml/g as determined by nitrogen adsorption.

FIG. 1 is a brief overview of one embodiment of the metal recovery process. Prior to metal recovery, spent catalyst recovered from an upstream hydroprocessing unit in one embodiment is first washed/deoiled to remove greater than 98 wt % of the hydrocarbon feed and product oils from the spent catalyst. The deoiling step is not shown in FIG. 1. Methods for deoiling/removing oils from solids containing spent catalysts are known in the art. In one embodiment, the spent catalyst is deoiled in contact with a sub-critical dense phase gas in a process as described in WO06117101A1. In another embodiment, the spent catalyst is deoiled with the use of an organic solvent, e.g., xylene, benzene, toluene, kerosene, etc., under an inert atmosphere, and dried to remove the organic solvent. Following deoiling, the solvent is stripped and separated from the hydrocarbon oil and recycled. The recovered oil is recycled to the upstream hydroprocessing unit. In yet another embodiment, deoiling is carried out using separation techniques including membrane/ion exchange, nano-filtration, cross flow filtration and the like, reducing the hydrocarbon content to less than 2 wt %.

Leaching: In one embodiment, the deoiled and dried spent catalyst particles in stream 1 are leached with an aqueous solution 2 containing ammonia and air in an autoclave 10, i.e., a multi-chambered, agitated vessel at a sufficient temperature and pressure, in which ammonia and air are supplied to induce leaching reactions, wherein the group VIB and group VIII metals are leached into solution forming group VIB and group VIII soluble metal complexes. In one embodiment, up to 90% of the (incoming) group VB metal in the feed stays in the coke phase (following discharge from the autoclave) and up to 10% of the incoming group VB metal is leached into solution. For example, for a spent catalyst feed stream containing 0.5 wt. % vanadium, up to 0.050 wt % ends up in the leach solution (based on the total weight of the feed stream).

In one embodiment, vanadium is converted into ammonium metavanadate, molybdenum is converted into molybdate compounds including ammonium orthomolybdate, and portions of nickel and cobalt (if any) are converted into amine complexes, e.g., cobalt amine sulfate, nickel amine sulfate, or the like, thereby being leached. In one embodiment, at least 70 wt % of the group VIB and group VIII metals are leached into solution. In another embodiment, at least 90 wt % of the nickel and molybdenum are leached into solution.

In one embodiment, as shown in FIG. 1, the deoiled spent catalyst in stream 1 is pressure leached according to US Patent Publication No. US2007/0025899, with the addition of ammonia and air in stream 2 to induce solubilization or leaching of metal sulfides from the spent catalyst. In one embodiment of the ammonical pressure leach, the leaching is carried out at a pressure proportional to the temperature. In a second embodiment, the sufficient leach temperature is between 120 to 250° C. In a third embodiment, the sufficient leach temperature is between 135 to 225° C. In one embodiment, the sufficient autoclave pressure is in the range of 0-1200 psig. In a second embodiment, from 100-1000 psig. In a third embodiment from 300 psig through about 800 psig.

In one embodiment, the spent catalyst particles are pressure leached from 60 minutes to 360 minutes. In another embodiment, the spent catalyst particles are pressure leached from 120 minutes to 300 minutes. In a third embodiment, the pressure leach is for a period of less than 240 minutes.

In one embodiment, the concentration of the leaching species and the pH of the leach solution are optimized with sufficient amounts of ammonia to complex the nickel, molybdenum, vanadium and cobalt (if any), and with sufficient free ammonia to control the pH within a range of 9 to 13. In one embodiment, the molar ratio of ammonia to nickel (plus any cobalt, if present) plus molybdenum plus vanadium is in the range of 20:1 to 30:1. In another embodiment, the ammonia concentration is maintained at a level of at least 1 wt %, and in a range of 2-7 wt % in yet another embodiment.

In one embodiment, the pressure leaching is carried out in an ammoniacal media at a pressure ranging from 0 to 1200 psig, at a temperature ranging from 100-300° C., and at a pH level of 8.0 or higher in order to efficiently allow the leaching reaction to progress. In another embodiment, the pH level is maintained between a range of 9 to 12.

In another embodiment (not illustrated in the Figure), the spent catalyst is first caustic leached under atmospheric pressure, according to U.S. Pat. No. 6,180,072, for an extended period of time before the pressure leaching step.

In yet another embodiment (not shown in the Figure), the leached slurry 11 following cooling is transferred to a depositing/holding tank equipped with appropriate equipment to further reduce the leached slurry temperature to 90° C. or less, prior to the next separation step.

Separating/Recovering Vanadium: The partially cooled leached slurry 11 is subject to liquid-solid separation via physical methods known in the art, e.g., settling, centrifugation, decantation, or filtration using a vertical type centrifugal filter or a vacuum filter or a plate and frame filter, and the like, into a liquid stream 21 (Pressure Leach Solution stream) containing the group VIB and VIII metal complexes together with ammonium sulfate and a small amount of group VB metal complexes (up to 10 wt % of the incoming group VB metal); the solid residue 22 comprises of coke and any group VB metal complex (up to 90 wt % of the incoming group VB metal). In one embodiment, the solid residue 22 comprises ammonium-containing vanadium salts such as ammonium metavanadate ($NH_4VO_3$) and coke. The filtrate or PLS (Pressure Leach Solution) stream 21 is subject to a precipitation step. Vanadium, as ammonium metavanadate ($NH_4VO_3$) is subsequently recovered from the coke residue 22.

In one embodiment, liquid-solid separation of the leached slurry 11 is carried out in a filtration device, wherein the solid residue 22 containing $NH_4VO_3$ precipitate and coke is separated out in the form of a filter cake from the Pressure Leach Solution containing ammonium molybdate, nickel amine sulfate and ammonium sulfate. Group VB metals such as vanadium can be subsequently extracted/recovered from the filter cake, according to US Patent Publication No. US2007/0025899, by temperature and pH modification; purified $NH_4VO_3$ is crystallized as a wet solid and subsequently dried and calcined into vanadium pentoxide pellets. The recovered vanadium has diverse industrial applications, including use as a chemical catalyst, preparation of stainless/alloy steels, superconductive magnets and the construction of batteries.

In one embodiment following liquid-solid separation, the PLS stream contains 10 to 100 gpL (grams per liter) molybdenum, 1 to 20 gpL nickel, 0.05 to 2.0 gpL vanadium, and 50 to 1000 gpL ammonium sulfate. In a second embodiment, the PLS stream contains 20 to 100 gpL (grams per liter) molybdenum, 5 to 20 gpL nickel, 0.10 to 1.0 gpL vanadium, and 100 to 500 gpL ammonium sulfate.

Precipitating Metal Complexes from the Pressure Leach Solution (PLS): In one embodiment of this step, the pH of the PLS 21 is controlled to a level at which selective precipitation of the metal complexes occurs ("pre-selected pH"), precipitating as metal complexes at least 90% of the Group VIB metal, at least 90% of the Group VIII metal, and at least 40% of the Group VB metal initially present prior to the precipitation. In one embodiment, about 50-80% of the vanadium leached into the PLS is recovered with the Mo—Ni precipitate with the rest remaining in solution. Up to 90% of the vanadium in solution can be subsequently recovered in an optional subsequent sulfidation step to further precipitate any molybdenum and nickel remaining in solution.

In one embodiment, the pH is adjusted to precipitate as metal complexes at least at least 95% of the Group VIB metal. In another embodiment, the pre-selected pH is less than about 3.5 to start precipitating at least 90% of soluble molybdenum complexes. In another embodiment, the pre-selected pH is from pH 1.0 to about 2.0 to initiate precipitation of at least 95% of soluble tungsten complexes. Generally, several metals can form a precipitate at a given pH. For example, at a pH level of less than 3, both Mo and Ni (and Co, if any) precipitate although more molybdenum precipitates relative to nickel. Additionally, the precipitating concept described herein can be repeated at another pH or pH range to precipitate other metals.

In one embodiment wherein the group VIB metal is molybdenum and there is an interest in precipitating most or a major portion of the molybdenum, the pH of the PLS is reduced from greater than 9.0 to less than 3.5 to precipitate greater than 90% of the Mo. In a second embodiment, the pH of the PLS is adjusted to a level of 3.0 to 3.3 to precipitate greater than 92% of the Mo. In a third embodiment, the pH of the PLS is adjusted to a level of 2.65 to 3.0 to precipitate greater than 95% of the Mo.

In one embodiment, a strong mineral acid 23 is added to the precipitating/mixing vessel 30 to adjust the pH. In another embodiment (not shown), the acid is added to the pressure leach solution 21 (PLS) feedstream. The acid used to precipitate the metal complexes may include any inorganic mineral acid with a relatively high ionization constant. In one embodiment, the acid is used in a strength ranging from 1.0 to 12.0 normal. In another embodiment, the acid is selected from the group of sulfuric acid, hydrochloric acid, phosphoric acid, nitric acid, and the like.

In another embodiment (not shown), a sulfur compound having a sulfhydryl group or an ionized sulfhydryl group or a sulfur compound, which is capable of producing a sulfhydryl group or an ionized sulfhydryl group, is used to adjust the pH of the PLS and induce precipitation. Examples include but are not limited to any sulfur compound which has a sulfhydryl (—SH) group or an ionized sulfhydryl group (—S(−1)). Compounds containing a sulfhydryl or an ionized sulfhydryl group include hydrogen sulfide and inorganic compounds containing sulfide ion, hydrosulfide ion or trithiocarbonate ion as well as organic compounds such as dithiocarbamates, xanthates, mercaptans and the soluble metal salts of these compounds, i.e., the alkali metal and alkaline earth metal salts. Furthermore, sulfur compounds which are capable of producing a sulfhydryl or an ionized sulfhydryl group, e.g., thioacetamide and reducible disulfides, can also be used. Examples of organic sulfur compounds which can be used include sodium, potassium or calcium salts of the following ions: ethyl xanthate ion, glucose xanthate ion, isopropyl xanthate ion, dimethyldithiocarbamate ion or diethyldithiocarbamate ion. Examples of inorganic sulfur compounds include sodium trithiocarbonate, potassium trithiocarbonate, calcium trithiocarbonate, sodium sulfide, potassium sulfide or calcium sulfide.

In one embodiment (not shown), the sulfur compound is a sulfide-containing compound, e.g., a water soluble sulfide, a water soluble polysulfide, or mixtures thereof, is employed to adjust the pH of the Pressure Leach Solution 21 to a level at which precipitation of the metal complexes occurs. In one embodiment, hydrogen sulfide, a combination of hydrogen sulfide and caustic soda, ammonium sulfide, NaHS, or $Na_2S$, or mixtures thereof is used in an amount of about 0.05 to 0.2 molar to precipitate out nickel, molybdenum, cobalt, and the like from the Pressure Leach Solution 21.

In one embodiment, the precipitation is carried out under mixing conditions at a temperature in the range of 50 to 95° C., a pH level of 1 to 4, and for a sufficient amount of time, e.g., for at least 1 hour, for at least 90% of the molybdenum and nickel in the PLS to precipitate out as a metal complexes. In another embodiment, the precipitation is carried out at a temperature of 70° C. and a pH level of between 2.5 to 3.3. In one embodiment, at least 95% of the molybdenum precipitates out after 2 hours as a molybdenum compound such as ammonium octamolybdate. In another embodiment, at least 90% of the nickel precipitates out with the molybdenum as nickel ammonium sulfate.

In one embodiment, the pH of the PLS is continuously regulated for at least part of the precipitation step with the continuous addition of the additive, e.g., mineral acid or sulfide-containing compound, to control the rate of the precipitation as well as the type of metal complexes precipitating from the PLS.

In one embodiment, a sufficient amount of sulfuric acid (20-100% by weight) is used to adjust the pH of the PLS to less than 3.5. In another embodiment, a sufficient amount of sulfuric acid is added to the PLS to target a pH of 3.0, with the mixture being maintained at a temperature of 60-90° C. for 1 to 3 hours, until 99% of the molybdenum precipitates out as molybdate compounds.

pH controllers known in the art can be used to automatically measure and control pH of the PLS for maximizing the amount of metals precipitated from the PLS. In one embodiment, a device using a voltametric sensor is used to control and regulate the pH of the PLS.

Separating/Recovering Precipitate of Mo and Ni Metal Complexes: After precipitation, the solid precipitate is separate from solution by known means including settling, filtration, decantation, centrifugation etc., or combinations thereof.

In one embodiment, following solid-liquid separation, over 99% of the incoming molybdenum and over 98% of the incoming nickel are recovered in the unwashed precipitate 41. In another embodiment, over 98% of the incoming molybdenum and over 90% of the nickel is recovered in the unwashed precipitate 41.

In one embodiment, the unwashed precipitate 41 contains 25-50 wt % Mo, 2 to 10 wt % Ni, less than 0.5 wt % V, less than 30 wt % AmSul, 1 to 10 wt % S, with a Mo to Ni ratio ranging from 5:1 to 25:1. In yet another embodiment, the unwashed precipitate 41 contains up to 35 wt % Mo, 6 wt % Ni, less than 0.05 wt % V and about 28 wt % in Amsul, has a light greenish blue color and is soluble in warm ammoniacal solution.

In one embodiment, after liquid-solid separation, the cooled precipitate 41 is optionally doubled washed with acidic water (not shown in FIG. 1) at ambient temperature having a pH in the range of 2-3.5 to remove adhering Amsul (ammonium sulfate) that may be entrained in the Mo—Ni precipitate. A portion of the wash water may be recycled to the leaching step as feed to the autoclave. The remaining wash water may be added to the supernatant (filtrate) 42 for additional precipitation and recovery of the residual Mo and Ni in the filtrate.

The solid precipitate 41, containing recovered metals, in one embodiment can be routed to a catalyst synthesis operation for the preparation of fresh catalysts. In another embodiment, the solid precipitate 41 undergoes further processing, for separating nickel from other metals by acid dissolution, filtration & solvent extraction.

The supernatant 42 recovered from the separation step is substantially free of Group VIB and Group VIII base metals. In one embodiment, substantially free means that the supernatant 42 recovered from the separation step contains 0.1 to 3% of the Group VIB metal in the spent dispersed catalyst, 1 to 20% of the Group VB metal in the spent dispersed catalyst, and 1 to 35% of the Group VIII metal in the spent dispersed catalyst for metal recovery. In another embodiment, the supernatant 42 is primarily Amsul, with small amounts of molybdenum, vanadium, and nickel. In one embodiment, the supernatant 42 contains 0.1 to 2% of the incoming molybdenum, 1 to 15% of the incoming vanadium, and 1 to 30% of the incoming nickel. In another embodiment, the supernatant 42 contains from 0.1 to 1% of the incoming molybdenum, 1 to 10% of the incoming vanadium, and 1 to 15% of the incoming nickel.

Optional Sulfide Precipitation of Residual Mo and Ni: In one embodiment, the pH of the Amsul supernatant 42 (plus optional wash water from washing the precipitate) is adjusted to further precipitate the small amount of metals left in the Amsul filtrate as metal sulfides. In one embodiment, the pH is adjusted to precipitate at least 95% of the Group VIB metal and at least 95% of the Group VIII metal initially present in the supernatant 42 prior to the precipitation.

In one embodiment, the pH is maintained at a level between 5 and 7 at a temperature of 60-95° C., in the presence of $H_2S$, following which a precipitate of Mo, Ni, and V sulfides is obtained. In another embodiment with cobalt being used as a promoter group VIII metal, as cobalt precipitation increases with increasingly alkaline solution pH, the pH is adjusted upward to 12 to precipitate more than 95% of the cobalt left in the Amsul supernatant.

In one embodiment, a water soluble sulfide-containing compound 51, e.g., a water soluble sulfide, a water soluble polysulfide, or mixtures thereof, is added to the Amsul supernatant 42 (and recycled wash water, if any) with pH adjustment, thus precipitating the small amount of metals dissolved therein. In one embodiment, the precipitation is carried out at a pressure from atmospheric to 100 psig and at a temperature ranging from 50-95° C. In yet another embodiment, ammonia is optionally added to the supernatant (filtrate) 42 to bring the solution pH to 7 prior to the addition of the water soluble sulfide containing compound.

In one embodiment, the water soluble sulfide-containing compound is selected from the group of hydrogen sulfide, ammonium sulfide, NaHS, or $Na_2S$, or mixtures thereof. In another embodiment, hydrogen sulfide is used in an amount of about 0.05 to 0.2 molar to precipitate out nickel, molybdenum, cobalt, and the like from the filtrate 42.

Optional Separation/Recovering Residual Mo and Ni Metal Sulfides: In the event that a (second optional) precipitation step (via sulfidation) is employed to further recover Ni and Mo from the supernatant (filtrate) 42 from separator 40, the metal sulfide slurry stream from precipitator 50 is sent to a separator (60). In this step, the solid precipitate containing residual metal sulfides is separated from the ammonium sulfate (Amsul) solution by known means including settling, filtration, decantation, centrifugation, etc., or combinations thereof.

In one embodiment, a filter press (not shown in FIG. 1) is used to separate the metal sulfide precipitates 62 from the ammonium sulfate solution 61. The solids 62, containing precipitated metal sulfides, are sent to a holding tank for subsequent metals recovery through the autoclave. In another embodiment, the solids 62, containing precipitated metal sulfides, are sent to a holding tank for off-site disposal to metals reclaimers.

The supernatant 61 recovered from this step is substantially free of Group VB, Group VIB and Group VIII metals, e.g., V, Mo and Ni. In one embodiment, substantially free means a removal rate of at least 90% for Group VB metals such as vanadium, and at least 95% for the Group VIB and Group VIII metals in the catalyst, e.g., molybdenum and nickel. In one embodiment, analysis of the ammonium sulfate solution 61 shows a concentration of 300 to 800 gpL Amsul, less than 100 ppm of the group VIB metals, less than 20 ppm of the Group VIII metals, and less than 100 ppm of the Group VB metals. In a second embodiment, the supernatant (ammonium sulfate solution) 61 has a concentration of 200 to 600 gpL Amsul, less than 50 ppm Mo, less than 10 ppm Ni, and less than 50 ppm V. In a third embodiment, the solution 61 contains 100 to 1000 gpL ammonium sulfate, less than 100 ppm molybdenum, less than 20 ppm nickel, and less than 100 ppm vanadium.

Ammonium sulfate can be recovered from stream 61 using methods known in the art. In one embodiment, the recovered ammonium sulfate is recycled for use as fertilizers.

EXAMPLES

The following illustrative examples are intended to be non-limiting.

Example 1

In this example, a PLS (deep blue color) stream with a pH of 9.2 was adjusted to 3.0 by single stage concentrated sulfuric acid (96%) addition. The PLS composition included 33 gpL free $NH_3$, 80.9 gpL Mo, 7.9 gpL Ni, 0.17 gpL V and 277 gpL ammonium sulfate (Amsul). After mixing for about 2-hours at a temperature of 70° C., about 99% of the molybdenum precipitates out as a molybdenum compound. Approximately 98% of the residual Ni also precipitates out with the molybdenum. It is believed that the compound is a mixture of ammonium octamolybdate and nickel ammonium sulfate.

The slurry is cooled to ambient and filtered to remove the precipitate. The precipitate is optionally double-washed with pH 3.0 water at ambient temperature to remove entrained ammonium sulfate. During the washing step, an additional 23% of Ni re-solubilizes to achieve a final Ni recovery of about 75%. Minimal re-solubilization of Mo occurs. The final solution (including wash) analyzes 0.53 gpL Mo, 1.49 gpL Ni, and 0.08 gpL V, for a metal precipitation efficiency of 99.2% Mo, 76.4% Ni, and 27.9% V.

The precipitate, appearing as light greenish with blue tinges, is soluble in warm ammoniacal solution. An analysis of the washed precipitated solids reveals a moisture of 34.2 wt %, 42.6 wt % Mo (dry basis), 3.17 wt % Ni (dry basis), minimal V (less than 0.02 wt %), 6.8 wt % Amsul, 3.4 wt % S and a Mo/Ni ratio of 13.4.

In the next step, a portion of the wash water is recycled to the autoclave feed. The remaining wash water and filtrate, which is primarily ammonium sulfate (Amsul), contain low levels of Mo & V together with moderate amounts of Ni. The solution pH is increased to about 7 with ammonia addition followed by sulfidation with $H_2S$ gas under pressure at 200-kPa (30-psi) for 2-hours. The pH is maintained between 6 & 7 at a temperature of 80° C. following which a precipitate of Mo, Ni and V sulfides is obtained. The slurry undergoes liquid-solid separation and the Amsul stream is further processed for recovering ammonium sulfate for use as fertilizer. Analysis of the final Amsul stream depicts 440 gpL Amsul, with 45 ppm Mo, less than 5 ppm Ni, and 26 ppm V.

Following precipitation, filtering and washing of the sulfided solids, the cake containing recovered metal sulfides is stored in a tank as autoclave feed inventory. It can also be sent for off-site disposal to metals reclaimers.

Example 2

Example 1 is repeated with a PLS stream having a pH of 10.6, containing 53 gpL free $NH_3$, 85 gpL Mo, 8.24 gpL Ni, 0.40 gpL V and 271 gpL ammonium sulfate (Amsul). The PLS stream pH is adjusted to 2.71. The final solution (including wash) shows 0.48 gpL Mo, 1.44 gpL Ni, and 0.08 gpL V, for a metal precipitation efficiency of 99.2% Mo, 77.3% Ni, and 75% V. The washed precipitated solids show a moisture of 25.9 wt %, 41.8 wt % Mo (dry basis), 3.37 wt % Ni (dry basis), 0.16 wt % V, 3.8 wt % AmSul, 2.76 wt % S and a Mo/Ni ratio of 12.4.

After sulfidation, the final Amsul stream concentration reveals 500 gpL Amsul, with 41 ppm Mo, less than 5 ppm Ni, and 26 ppm V.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of recovering metals from a spent dispersed catalyst originating from a Group VIB metal sulfide catalyst and at least a Group VB metal promoted with a Group VIII metal for hydrocarbon oil hydroprocessing, the method comprising the steps of:

contacting the spent dispersed catalyst with a leaching solution containing ammonia and air to dissolve the Group VIB metal and the Group VIII metal into the leaching solution at a sufficient temperature and pressure to form a pressure leach slurry containing at least a Group VIB soluble metal complex and at least a Group VIII soluble metal complex and solid residue containing at least a Group VB metal complex and coke;

separating and removing the solid residue containing the Group VB metal complex and coke from the pressure leach slurry, forming a pressure leach solution;

mixing the pressure leach solution with an additive selected from the group consisting of a mineral acid, a sulfide-containing compound, and a sulfur compound under mixing conditions at a temperature in the range of 50 to 90° C. for a sufficient amount of time to precipitate at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal.

2. The method of claim 1, wherein the Group VB metal is vanadium, and wherein the Group VB metal complex comprises ammonium metavanadate.

3. The method of claim 1, further comprising the step of:
recovering the precipitated metal complexes by at least a separation means selected from settling, filtration, decantation, centrifugation and combinations thereof, forming a first supernatant substantially free of at least a portion of the Group VIB metal and at least a portion of the Group VIII metal.

4. The method of claim 3, wherein the first supernatant contains 0.1 to 3% of the Group VIB metal in the spent dispersed catalyst for metal recovery, 1 to 20% of the Group VB metal in the spent dispersed catalyst for metal recovery, and 1 to 35% of the Group VIII metal in the spent dispersed catalyst for metal recovery.

5. The method of claim 4, further comprising the step of:
precipitating from the first supernatant at least a portion of the Group VIB metal and at least a portion of the Group VIII metal, wherein the precipitation being carried out at a second pre-selected pH to precipitate as metal complexes at least 95% of the Group VIB metal and at least 95% of the Group VIII metal initially present in the first supernatant prior to the precipitation at the second pre-selected pH.

6. The method of claim 5, further comprising the step of:
recovering the Group VIB and group VIII metal sulfides by at least a separation means selected from settling, filtration, decantation, centrifugation and combinations thereof, forming a second supernatant containing less than 100 ppm of the group VIB metal, less than 20 ppm of the Group VIII metal, and less than 100 ppm of the Group VB metal.

7. The method of claim 1, wherein at least 90% of the Group VIB metal precipitates from the pressure leach solution as a metal complex.

8. The method of claim 1, wherein the Group VIB metal is molybdenum and wherein the first pre-selected pH is in the range of 2.5 to 3.3 to precipitate greater than 90% of the molybdenum as a molybdate complex.

9. The method of claim 8, wherein the pressure leach solution (PLS) is adjusted to the first pre-selected pH by adding to the PLS at least one of a mineral acid or a sulfur compound having a sulfhydryl group or an ionized sulfhydryl group, or mixtures thereof.

10. The method of claim 9, wherein the pH of the PLS is adjusted to a pH of 3.5 or less with an acid selected from the group of sulfuric acid, hydrochloric acid, phosphoric acid and nitric acid.

11. The method of claim 10, wherein the PLS is adjusted to a pH of 3 or less with the addition of a sulfuric acid for at least 95% of the molybdenum to precipitate out as a molybdate complex.

12. The method of claim 9, wherein the pH of the pressure leach solution is adjusted to a pH of 3 or less with at least one of a water soluble sulfide, a water soluble poysulfide, or mixtures thereof.

13. The method of claim 1, wherein the Group VIB metal in the spent dispersed catalyst for metal recovery is molybdenum, the Group VIII metal in the spent dispersed catalyst for metal recovery is nickel, the Group VB metal in the spent dispersed catalyst for metal recovery is vanadium, and wherein the first supernatant contains 0.1 to 3% of the molybdenum present in the spent dispersed catalyst, 1 to 20% of the vanadium present in the spent dispersed catalyst, and 1 to 35% of the nickel present in the spent dispersed catalyst.

14. The method of claim 13, wherein at least one of a water soluble sulfide, a water soluble poysulfide, or mixtures thereof is added to the first supernatant for a pH level of between 5 and 7 to obtain a precipitate of Mo, Ni, and V sulfides.

15. The method of claim 14, wherein $H_2S$ is added to the first supernatant at a pressure from atmospheric to 100 psig and at a temperature ranging from 50 to 95° C.

16. The method of claim 6, wherein the Group VIB metal in the spent dispersed catalyst for metal recovery is molybdenum, the Group VIII metal in the spent dispersed catalyst for metal recovery is nickel, the Group VB metal in the spent dispersed catalyst for metal recovery is vanadium, the pressure leach solution is adjusted to a pH of 3 or less with the addition of a sulfuric acid for at least 95% of the molybdenum to precipitate out as a molybdate complex, the molybdate complex is separated from the first supernatant by filtration, $H_2S$ is added to the first supernatant at a pressure from atmospheric to 100 psig and at a temperature ranging from 50-95° C. to obtain a precipitate of Mo, Ni, and V sulfides, the Mo, Ni, and V sulfides are separated from the second supernatant by filtration, and wherein the second supernatant contains 100 to 1000 gpL ammonium sulfate, less than 100 ppm molybdenum, less than 20 ppm nickel, and less than 100 ppm vanadium.

17. A method of recovering metals from a spent dispersed catalyst, the method comprising the steps of:
contacting the spent dispersed catalyst with a leaching solution containing ammonia and air to dissolve the Group VIB metal and the Group VIII metal into the leaching solution at a sufficient temperature and pressure to form a pressure leach slurry containing at least a Group VIB soluble metal complex and at least a Group VIII soluble metal complex, ammonium sulfate and solid residue containing at least a Group VB metal complex and coke;

separating and removing the solid residue containing the Group VB metal complex and coke from the pressure leach slurry, forming a pressure leach solution;

mixing the pressure leach solution with an additive selected from the group consisting of a mineral acid, a sulfide-containing compound, and a sulfur compound under mixing conditions at a temperature in the range of 50 to 90° C. for a sufficient amount of time to precipitate at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal;

wherein the spent dispersed catalyst originates from a hydroprocessing catalyst having a general formula $(X)_a(M)_b[(CH_3CH_2)_cN(CH_3)_3]_dO_z$ and containing at least a group VB metal, wherein X is a Group VIII non-noble metal, M is a group VIB metal selected from Mo and W and combinations thereof, c is an integer from 10 to 40, the molar ratio of a:b is from 0.5/1 to 3/1.

18. The method of claim 17, further comprising the steps of:
recovering the precipitated metal complexes by filtration, forming a first supernatant containing 0.1 to 3% of the Group VIB metal in the spent dispersed catalyst for metal recovery, 1 to 20% of the Group VB metal in the spent dispersed catalyst for metal recovery, and 1 to 35% of the Group VIII metal in the spent dispersed catalyst for metal recovery;
precipitating from the first supernatant at least a portion of the Group VIB metal and at least a portion of the Group VIII metal, wherein the precipitation being carried out at a second pre-selected pH to precipitate as metal sulfides at least 95% of the Group VIB metal and at least 95% of the Group VIII metal initially present in the first supernatant prior to the precipitation at the second pre-selected pH;
recovering the Group VIB and Group VIII metal sulfides by filtration, forming a second supernatant containing less than 100 ppm of the Group VIB metal, less than 20 ppm of the Group VIII metal, and less than 100 ppm of the Group VB metal.

19. The method of claim 18, wherein the Group VIB metal is molybdenum and wherein the pre-selected pH is in the range of 2.5 to 3.3 to precipitate greater than 90% of the molybdenum.

20. The method of claim 18, wherein the spent dispersed catalyst originating from a hydroprocessing catalyst having a median particle size of 0.01 to 200 microns.

21. The method of claim 18, wherein the spent dispersed catalyst has a pore volume of 0.05-5 ml/g as determined by nitrogen adsorption.

22. A method of recovering metals including vanadium from a spent dispersed catalyst; the method comprising the steps of:
contacting the spent dispersed catalyst with a leaching solution containing ammonia and air to dissolve the Group VIB metal and the Group VIII metal into the leaching solution at a sufficient temperature and pressure to form a pressure leach slurry containing at least a group VIB soluble metal complex and at least a group VIII soluble metal complex, ammonium sulfate and solid residue containing at least a Group VB metal complex and coke;
separating and removing the solid residue containing ammonium metavanadate and coke from the pressure leach slurry, forming a pressure leach solution;
mixing the pressure leach solution with an additive selected from the group consisting of a mineral acid, a sulfide-containing compound, and a sulfur compound under mixing conditions at a temperature in the range of 50 to 90° C. for a sufficient amount of time to precipitate at least a portion of the Group VIB metal and at least a portion of the Group VIII metal, wherein the precipitation being carried out at a first pre-selected pH to precipitate as metal complexes at least a portion of the Group VIB metal and at least a portion of the Group VIII metal;
recovering the metal complexes by filtration, forming a first supernatant containing 0.1 to 3% of the Group VIB metal in the spent dispersed catalyst for metal recovery, 1 to 20% of the Group VB metal in the spent dispersed catalyst for metal recovery, and 1 to 35% of the Group VIII metal in the spent dispersed catalyst for metal recovery;
precipitating from the first supernatant at least a portion of the Group VIB metal and at least a portion of the Group VIII metal, wherein the precipitation being carried out at a second pre-selected pH to precipitate as metal complexes at least 95% of the Group VIB metal and at least 95% of the Group VIII metal initially present in the first supernatant prior to the precipitation at the second pre-selected pH; and
recovering the Group VIB and group VIII metal sulfides by filtration, forming a second supernatant containing less than 100 ppm of the group VIB metal, less than 20 ppm of the Group VIII metal, and less than 100 ppm of the group VB metal;
wherein the spent dispersed catalyst originates from a hydroprocessing catalyst having a general formula $(M^t)_a(X^u)_b(S^v)_d(C^w)_e(H^x)_f(O^y)_g(N^z)_h$ containing at least a Group VB metal, wherein M is at least one group VIB metal, X is at least one of a non-noble Group VIII metal, a Group VIIIB metal, a Group VIB metal, a Group IVB metal, and a Group IIB metal, $0=<b/a=<5$, $(a+0.5b)<=d<=(5a+2b)$, $0<=e<=11(a+b)$, $0<=f<=7(a+b)$, $0<=g<=5(a+b)$, $0<=h<=0.5(a+b)$; t, u, v, w, x, y, z, each representing total charge for each of: M, X, S, C, H, O and N, respectively; $ta+ub+vd+we+xf+yg+zh=0$.

* * * * *